United States Patent [19]

Sharp

[11] Patent Number: 5,320,247
[45] Date of Patent: Jun. 14, 1994

[54] STORAGE TANKS WITH INTERNAL SUPPORT RIBS

[76] Inventor: Bruce R. Sharp, 126 Leland Way, Marco Island, Fla. 33937

[21] Appl. No.: 114,160

[22] Filed: Sep. 1, 1993

[51] Int. Cl.⁵ .............................................. B65D 25/00
[52] U.S. Cl. .................................. 220/654; 220/4.12; 29/402.09; 29/402.18
[58] Field of Search ............... 220/651, 654, 565, 4.12, 220/4.13; 29/402.09, 402.18

[56] References Cited

U.S. PATENT DOCUMENTS

| | | | |
|---|---|---|---|
| 2,154,044 | 4/1939 | Hartman | 220/654 |
| 2,164,660 | 7/1939 | Miller | 220/654 |
| 2,269,617 | 1/1942 | Borstel | 220/654 |
| 4,739,659 | 4/1988 | Sharp | 220/445 X |
| 4,781,777 | 11/1988 | Pugnale et al. | 156/187 |
| 4,923,081 | 5/1990 | Weaver et al. | 220/72 |
| 4,925,046 | 5/1990 | Sharp | 220/5 A |
| 4,995,528 | 2/1991 | Sharp | 220/651 X |
| 5,072,609 | 12/1991 | Sharp | 73/49.2 |
| 5,102,005 | 4/1992 | Trussler | 220/4.12 |
| 5,115,936 | 5/1992 | Bartlow | 220/426 |
| 5,167,142 | 12/1992 | Sharp | 220/4.12 X |

*Primary Examiner*—Steven M. Pollard
*Attorney, Agent, or Firm*—Charles R. Wilson

[57] ABSTRACT

A method of forming a storage tank from an existing matrix tank comprises adding spaced internal support ribs. The interior surface of the matrix tank is covered with a layer of fibrous reinforced resinous material to form a main body and internal support ribs are added. The main body and support ribs are secured together such that the ribs protrude inwardly. The formed tank is fully and independently capable of containing liquid and withstanding normal internal and external load forces. A double walled formed storage tank system is also provided wherein an inner wall between or on the internal support ribs is added.

24 Claims, 3 Drawing Sheets

STORAGE TANKS WITH INTERNAL SUPPORT RIBS

This invention relates to storage tanks. More particularly, the invention relates to internally ribbed underground storage tanks.

BACKGROUND OF THE INVENTION

Underground storage tanks for the bulk storing of liquids typically hold up to about 50,000 gallons of liquid. The tanks must be sufficiently strong to withstand internal forces exerted by the weight of the liquid as well as normal external ground forces. They must be reliable in that even the smallest of leaks over time can eventually cause substantial damage to the environment.

Storage tanks which are intended for burial underground to hold gasoline such as commonly found at retail gasoline service stations are typically warranted for at least ten years. The tanks, per se, are expensive as is their installation. Any storage tank which is suspected of leaking can be inspected. Various leak-testers have been developed and commercialized for this purpose. It is also possible to empty the tank and then access its interior for a close-up visual and/or hand-held instrument wall inspection. In the past, any tank with a suspected or actual leakage problem could be repaired. It was conventional to apply a coating of polyester or epoxy coating material to the entire interior of the tank. A coating of from 100 to 300 mils was considered adequate to refurbish the tank to its original integrity.

In certain instances a tank may be too extensively corroded or cracked to repair it. Additionally, recent federal and state regulations in the industry have severely limited the availability of coating a tank's interior as an option to solving a leakage problem. Removing a buried underground storage tank and replacing it with a new storage tank is very expensive. The down-time of the service station is also costly in terms of lost revenue.

In accord with a need, there has been developed a new method of building underground storage tanks. The method utilizes an existing buried tank which is in need of refurbishing. Normal removal and installation costs are eliminated. The resultant in situ formed tank enjoys all of the benefits of factory manufactured tanks.

SUMMARY OF THE INVENTION

A method of building an internally ribbed storage tank using an existing cylindrical-shaped storage tank as a matrix, comprises the steps of (a) applying a layer of fibrous reinforcing material and resinous material over the interior surface of the matrix tank to form a cylindrical-shaped first wall and end caps; (b) positioning spaced support ribs circumferentially around the interior of the cylindrical-shaped matrix tank; and (c) securing together the support ribs and cylindrical-shaped first wall in a manner whereby the support ribs protrude inwardly. When cured, an internally ribbed storage tank of fibrous reinforced resinous material is formed which is capable of withstanding external and internal load forces normally encountered by underground storage tanks.

DETAILED DESCRIPTION OF THE INVENTION

The method of this invention utilizes an existing underground storage tank as a matrix in forming a storage tank. The matrix tank can be a metal tank or a fibrous reinforced resinous tank having a cylindrical-shaped main body and end caps. Such tanks represent a very conventional design. Each will have typically been field tested to ascertain a leakage problem which needs to be rectified. Any major corrosion damage or crack in the matrix tank can first be repaired, though need not be. The method of this invention lends itself particularly well to the formation of an in situ storage tank in an existing buried tank which is in need of rejuvenation. The resultant formed tank is fully capable of independently containing liquid and independently withstanding normal load forces. The existing tank is merely used as a matrix in which the new tank is formed.

Figure 1:
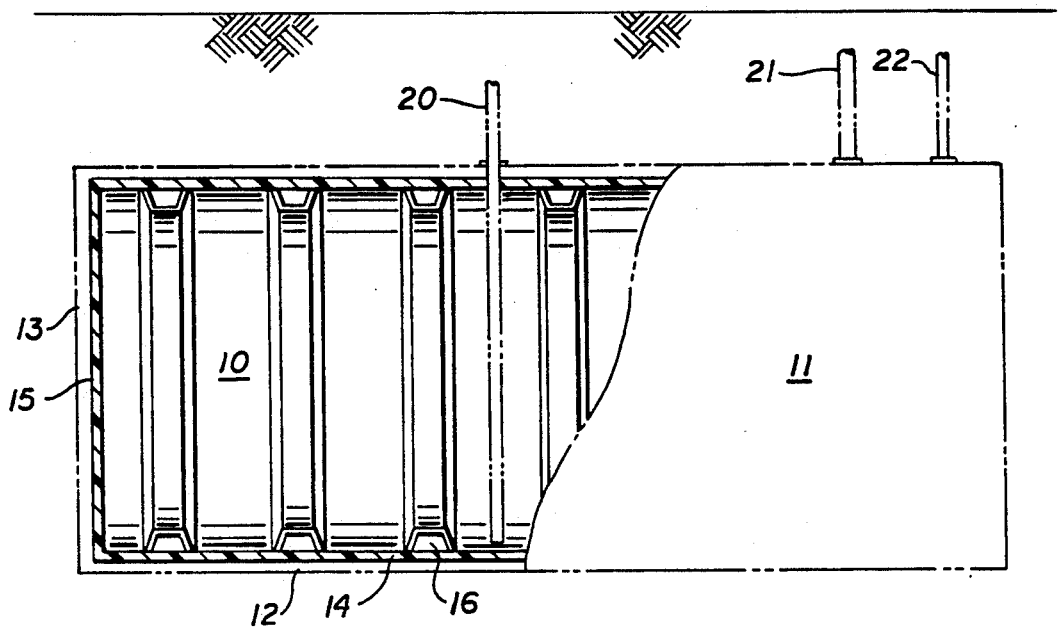
FIG. 1 is a side view partially in section of an in situ storage tank of this invention having internal support ribs formed on a matrix metal tank.

With reference to FIG. 1, there is shown an internally ribbed storage tank 10 of the invention formed inside an existing matrix tank 11. The matrix tank 11 comprises a cylindrical-shaped main body 12 and end caps 13. The main body 12 and end caps 13 are made of metal, preferably steel. The interior of the matrix tank is a smooth walled cylindrical-shaped container.

In the method of this invention, any sludge or other contaminate material is initially removed from the matrix tank 11. Preferably, the entire interior surface of the tank is sand-blasted to remove foreign substances and to roughened the surface to better serve as a temporary surface while a first wall and end caps are being formed as further discussed below. Any access lines such as used for filling, dispensing and venting purposes are temporarily disconnected and any openings capped or masked over.

In accord with the embodiment of the invention shown in FIG. 1, a cylindrical-shaped main body 14 and end caps 15 are formed directly on the interior surface of the matrix tank 11. The main body and end caps are made from a fibrous reinforced resinous material. The fibrous material used can take on many different physical shapes and structures, variously referred to as mattings, nets, screens, meshes, and chopped strands. Examples of fibrous materials include fiberglass, nylon, and other synthetic fibrous materials. The fibrous material, if in sheet form, is laid onto the interior surface of the matrix tank as a continuous matting and at least temporarily adhered thereto until the resinous material is applied and cured as discussed in the immediately following paragraphs.

Once the fibrous reinforcing material is applied, a resinous material is next applied and thereafter cured. Several different resinous materials are known for the purpose of reinforcing fibrous material. Such materials include polyesters, e.g. vinylesters, isophthalic polyesters, polyethylene, polypropylene, polyvinylchloride, polyurethane, and polyepoxide. The listed resinous materials used in the construction of the main body and end caps are not all inclusive, but only illustrative of some of the resinous materials which can be used.

Alternatively, the fibrous material is applied in the form of chopped strands along with the resinous materials. Thus, the chopped strand and resinous material are sprayed from separate nozzles of the same spray gun and the cylindrical-shaped main body 14 and end caps 15 are formed therefrom.

Circumferentially extending support ribs 16 are next positioned around the inside of the cylindrical-shaped main body and are secured thereto. The support ribs are preferably uniformly spaced along the first wall and protrude inwardly. A centerline spacing of from about four inches to about thirty inches is preferred. A closer spacing tends to result in a stronger tank, though the added costs are not justified.

The support ribs 16 made of a fibrous reinforced resinous material are typically formed on a cardboard core 17. A layer of fibrous reinforcing material is applied over each cardboard core and a resinous material is applied onto or with the fibrous reinforcing material. When the resinous material is cured the resultant overlay 18 comprised of the two materials is rigid and securely bonded to the cardboard core 17 and main body 14. The reinforcing material can be applied as a sheet of fiberglass, nylon or other synthetic fibrous material or in the form of chopped strands from a spray gun. In the latter case, the resinous material is applied substantially simultaneously and also in a spray form. Curing the resin occurs within minutes.

The support ribs 16 in FIG. 1 are hollow and have a trapezoid shape. They form open spaces when placed on the main body 14. The ribs can also be built from a foam mold such that the foam and a subsequently applied overlay act as rigid support ribs. Other rib structures made from pre-casted materials such as wood, concrete, rigid plastic and steel in various shapes such as square and rounded can as well be used. Support ribs which extend around the interior of the tank in a spiral pattern are also contemplated, though are less preferred because of increased labor and equipment costs. Most importantly, the ribs are rigid and are permanently secured to the main body of the formed tank.

The ribs add strength needed to withstand earth load stresses. Such ribs when properly formed and secured to the cylindrical-shaped first wall results in a tank which is capable of withstanding load forces normally encountered. The formed tank has the necessary strength without any strengthening contribution from the matrix tank.

Each internal support rib 16 of FIG. 1 has apertures 19 extending through both side walls at or near a lowermost point in the formed tank. The purpose of the apertures is to allow stored liquid to flow freely to avoid pools of liquid between the ribs. As shown in FIG. 1 a dispensing line 20 extends into the formed tank between support ribs to near the bottom surface. It, thus, terminates at a point below the ribs' top surfaces. Also shown is a fill line 21 and a vent line 22.

In another embodiment of the invention shown in FIG. 3, a formed double wall storage tank system 25 comprised of the cylindrical-shaped main body 26, end caps (not shown), and support ribs 27 produced inside a matrix tank as described with reference to FIG. 1 has an inner wall added. The inner wall is comprised of a series of solid sheet wall sections 28 which are tied into the support ribs 27 and inner end caps. Each wall section 28 is at least partially separated from the tank's main body 26. Examples of solid sheet materials used to form the wall sections 28 include metal sheets and fiberglass/resin sheets. Because of manufacturing difficulties, portions of the wall sections may contact the main body 26. Such contact is not detrimental to the storage tank's performance and is actually preferred provided the two walls remain at least partially separated. The inner end caps are either preformed or formed in place. They are made preferably of a fibrous reinforced resinous material and have a shape which follows the contour of the end caps.

The bonding technique used to secure the wall sections 28 to side walls of the support ribs 27 will depend on the materials of construction of the sections, per se, and the support rib surface covering. Preferably, the support ribs 27 are secured to the cylindrical-shaped main body 26 by an overlay 29 of a fibrous reinforced resinous material and the wall sections 28 are made of fibrous reinforced resinous material. In this case, additional resinous material is used for the bonding purpose.

The wall sections 28 together with the support ribs 27 and inner end caps create a container which is capable of containing liquid. Most importantly, in effect a double walled tank is built with only one set of ribs. The protruding ribs create an angle on the inner wall that greatly increases its strength. The result is a double walled storage tank system which is economically built with a minimum of labor intensive steps and which has sufficient strength without excessive wall thickness to meet or exceed mandated structural requirements. The main body wall and inner wall of the storage tank system 25 are both able to withstand internal and external load forces encountered during use. Another feature of the storage tank system herein is its secondary containment and monitor means capability.

Figure 3:
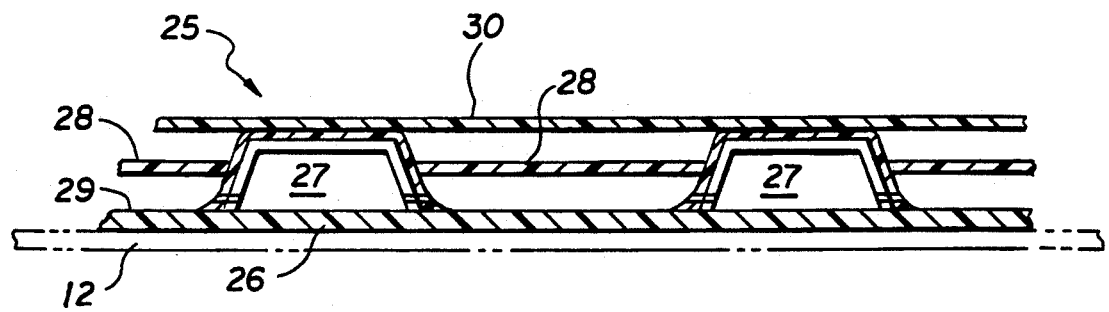
FIG. 3 is a side view in section of a support rib area of an internally ribbed storage tank of this invention wherein inner wall sections made from solid sheet material have been added between the support ribs to provide secondary containment means and an innermost wall has been added to provide a smooth bottom wall surface.

Still with reference to FIG. 3, a smooth continuous innermost wall 30 is installed at least on top of the internal support ribs 27 at the ribs' lowest point in the formed tank. At least about 10% of the support ribs, top surface area is covered by the innermost wall. The purpose of this wall is to provide a smooth bottom whereby stored liquid is readily accessed for dispensing purposes. The innermost wall 30 can as well extend completely around the inside of the tank system to fully cover the support ribs.

When needed, a separating material having an impervious outer planar surface is applied to the surface area on the tank's inner surface between the ribs 27, including end caps. The purpose of the separating material is to ensure that the subsequently applied fibrous reinforcing material and resinous material which form the inner wall comprised of the wall sections 28 and inner end caps will not seal to the main body 26 and end caps of the formed tank.

Separating materials include solid polymeric films as well as foraminous or porous materials which are sealed on at least one side. Many pliable or semi-rigid materials are usable. Examples of such material are polyethylene, jute, polyurethane foam, polyester foam, polyether foam, fiberglass matting, cotton matting, nylon matting, corrugated cardboard, and asbestos which range from about 0.01 inches to almost 1.5 inch in thickness. A heat seal or sealing material, e.g. a polymeric coating, is used on one surface of any foraminous materials when needed to prevent substantial saturation with a subsequently applied resinous material. Wax, which is subsequently heated and removed is also used as a separating material.

Figure 4:
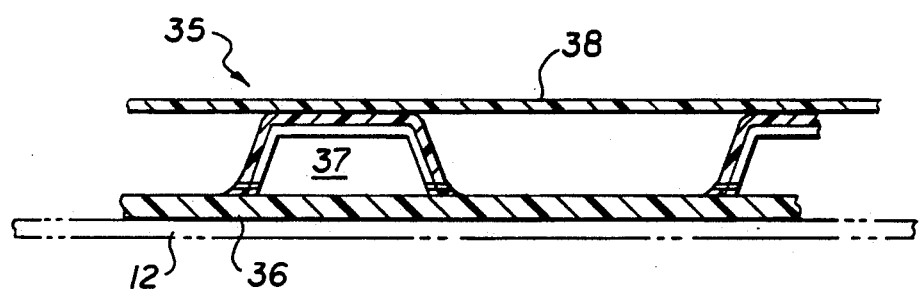
FIG. 4 is a side view in section of a support rib area found on another internally ribbed storage tank of the invention wherein an innermost wall has been added to provide secondary containment and a smooth bottom wall surface.

With reference to FIG. 4, another double walled formed storage tank system 35 produced by the method of the invention is illustrated. The matrix tank has a cylindrical-shaped main body 36 and end caps (not shown) formed over its entire surface initially, then the spaced support ribs 37 are positioned circumferentially around the tank and secured thereto. The main body, end caps and overlay are produced by the fibrous reinforcing materials and resinous materials described above. Finally, an inner wall 38 is formed over the tops of the support ribs and secured thereto so as to fully cover the support ribs to present a smooth continuous inner containment area.

Figure 5:
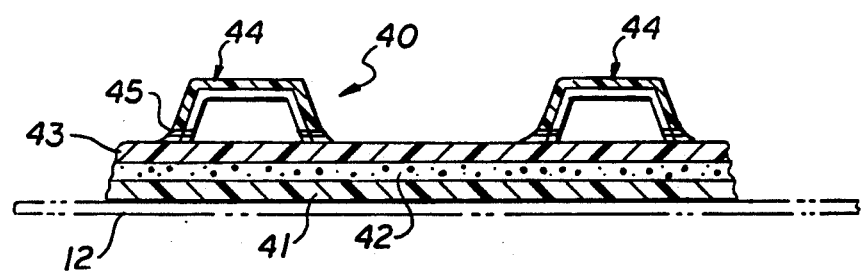
FIG. 5 is a side view in section of a support rib area of still another internally ribbed storage tank of this invention illustrating a formed tank with secondary containment.

As shown in FIG. 5, a double walled formed storage tank system 40 is first formed inside the matrix tank and a set of spaced support ribs added as a final step. Thus, a main body 41 and end caps (not shown) are initially formed on the entire inside surface of the matrix tank, a separating material 42 applied to cover the main body and end caps' surface and then a cylindrical-shaped inner wall 43 and inner end caps formed directly on the separating material. The main body and inner walls and the end caps are made of the same fibrous and resinous materials described above. The support ribs 44 are finally added and secured to the inner wall by overlays of fibrous reinforced resinous material. Apertures 45 are provided through the support ribs at or near the lowest point in the formed tank to allow stored liquid to flow freely.

In the embodiment of the invention discussed with reference to FIG. 5 the continuous sheet of fibrous separating material 42 serves the dual function of being a separating material and a part of the inner wall 43 and inner end caps. The sheet of material is about 0.05 inches to about 1.5 inches thick. A resinous material applied to the top surface of the fibrous material forms the inner wall and inner ends caps. Complete penetration of resin into the fibrous material is avoided. In effect the portion of the fibrous material sheet adjacent the main body is a separating material and the top surface portion together with the resinous material forms the inner wall.

Figure 2:
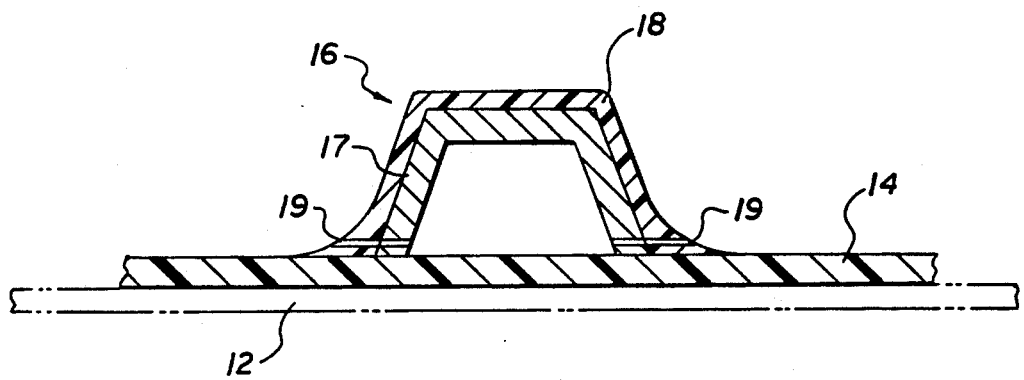
FIG. 2 is an enlarged sectional view of a support rib area found on the formed storage tank of FIG. 1.
Figure 6:
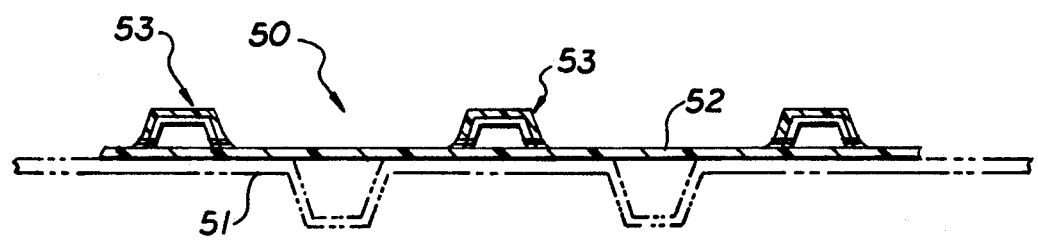
FIG. 6 is a side view in section of a support rib area of an internally ribbed storage tank of the invention formed on a matrix tank which is made of fibrous reinforced resinous material and has integral support ribs.

The formed internally ribbed storage tank 50 of FIG. 6 is produced by the same sequence of steps used in forming the in situ tank illustrated in FIGS. 1 and 2. However, the matrix tank 51 is itself a ribbed storage tank. Initially, the cylindrical-shaped main body 52 is formed. The internal support ribs 53 as illustrated are added substantially equi-spaced between the ribs of the matrix tank. However, they can as well be added directly over the cavities created by the ribs in the matrix tank. The formed tank enjoys all the benefits of the tank as described above, as well as those of factory manufactured tanks.

Figure 7:
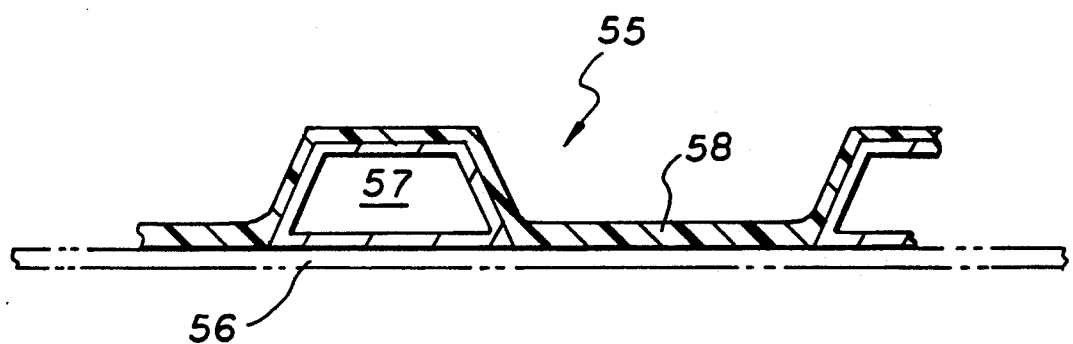
FIG. 7 is a side view in section of a support rib area of another internally ribbed storage tank of the invention wherein the support ribs are initially positioned directly on the matrix tank and then the main body formed.

While less preferred because of manufacturing problems, the internal support ribs can first be added to the matrix tank and then the cylindrical-shaped main body and end caps added to produce the formed tank 55 illustrated in FIG. 7. Thus, the existing tank 56 buried in the ground is initially cleaned and preferably sand blasted. Next, the internally protruding support ribs 57 are installed to extend circumferentially around the main body of the matrix tank. The support ribs are solid or at least have a solid bottom wall to eliminate any problems which may occur with open bottom support ribs and eventual structural failure of the matrix tank. The fibrous reinforced resinous material is then applied over the matrix tank's exposed main wall and end caps to form the main body 58 and inner end caps. The main body 58 also bonds to the side walls of the internal support ribs 57 and can extend completely over them. An inner wall is optionally applied over the support ribs top surfaces at least at the lowermost portions of the tank to create a smooth continuous bottom wall for ready dispensing of stored liquid. Alternatively, when the support ribs are hollow and have a solid bottom wall, the ribs are provided with a series of apertures through their side walls to allow the stored liquid to flow freely so to eliminate any stagnant pools of liquid.

Figure 8:
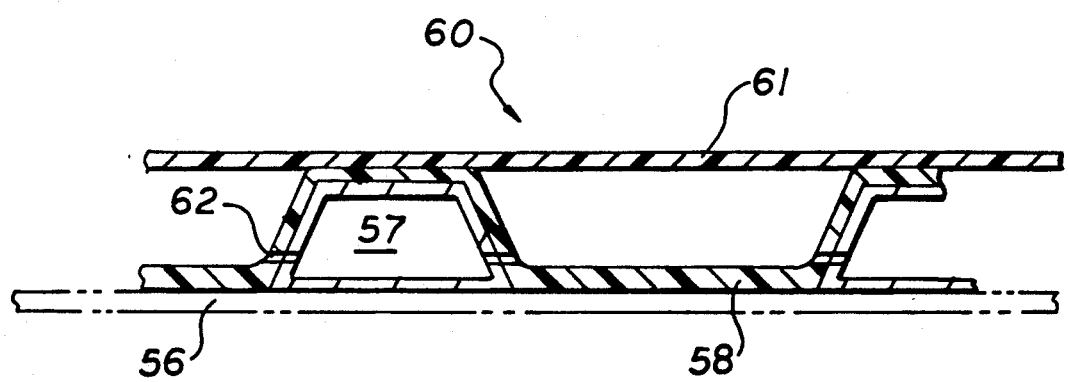
FIG. 8 is a side view in section of a support rib area of an internally ribbed double walled storage tank system of the invention wherein the support ribs are initially positioned directly on the matrix tank.

FIG. 8 illustrates a double walled internally ribbed storage tank system 60. The tank shown in FIG. 7 and discussed above is given an inner wall and an inner set of end caps. The inner wall 61 extends across and is attached to the top surface of the internally protruding support ribs 57 to create a smooth interior surface. Preferably, a set of apertures 62 is provided in each support rib between the main body 58 and inner wall 61 for monitoring purposes.

Any well known and commercially available monitor means can be used for monitoring the spaces between the ribs or the total annular space in any of the above described double walled formed tank systems. For example, any closed space can be placed under a non-atmospheric pressure, i.e. either a positive or negative air pressure. Detection means associated with the closed space is capable of detecting any change in pressure resulting from a leak in the wall sections or the storage tank. Another detection means which can be used is an analyzer capable of detecting the liquid being stored. Thus, the detection means comprises the analyzer which is communication with the closed space. Still another detection means utilizes a probe which extends through an access tube so as to monitor for leakage at or near the bottom of the closed space. The probe is capable of detecting preselected liquids or gases. In this embodiment, leakage will ultimately seep to the bottom of the closed space and be detected.

All the leak detection means discussed above can be electronically linked with an alarm system to audibly or visually warn of a pre-set significant change in the closed spaces. The leak detection means and secondary containment means allow for an early warning of a deterioration of either the primary or secondary containment means thereby permitting the necessary repair work to be done before any significant soil or water contamination has occurred.

While the invention has been described with respect to preferred embodiments, it is understood that various modifications may be made without departing from the spirit of the subject invention as defined by the appended claims. For example, while the storage tanks of the invention are described as being formed in a buried underground matrix tank, the tanks can be formed in a previously removed used tank in a factory setting and then installed. All obvious variations are within the scope of the claims.

What is claimed is:

1. A method of building an internally ribbed storage tank inside a cylindrical-shaped matrix tank in a manner whereby the formed tank is fully and independently capable of containing liquid and withstanding normal external and internal load forces normally encountered by underground storage tanks, comprising the steps of:
   (a) applying a layer of fibrous reinforcing material and resinous material onto the interior surface of the matrix tank to form a cylindrical-shaped main body and first end caps;
   (b) positioning spaced support ribs circumferentially around the inside of the matrix tank; and (c) securing the support ribs and the main body together in a manner whereby the support ribs protrude inwardly so as to provide the formed tank.

2. The method of claim 1 wherein the cylindrical-shaped main body is initially formed on the matrix tank and then the support ribs are positioned and secured to the main body.

3. The method of claim 1 wherein the support ribs are initially positioned on the matrix tank and then the main body and end caps formed and secured to the support ribs.

4. The method of claim 1 further comprising the step of cleaning the interior walls of the matrix tank sufficiently to at least temporarily retain a formed wall on its surface.

5. The method of claim 1 wherein the fibrous reinforcing material and resinous material are applied substantially simultaneously.

6. The method of claim 5 wherein the support ribs are substantially uniformly spaced around the inside of the main body with on-centerline spacings of from about four inches to about thirty inches.

7. The method of claim 6 further comprising adding apertures in the side walls of the support ribs at or near a lowermost portion to allow the free flow of liquid therethrough.

8. The method of claim 6 further comprising adding an inner wall on the support ribs top surfaces to cover at least the lowermost 10% of the support ribs to provide a smooth continuous surface.

9. The method of claim 1 further comprising forming an inner wall comprised of a series of wall sections which are at least partially separated from the formed tank's main body between each set of spaced support ribs to form a double wall storage tank system, each said wall section bonded to side walls of the support ribs at a distance less than about 90% of the height of the support ribs wherein the main body and the inner wall of the formed storage tank system derive their strength from said support ribs so as to withstand the external and internal load forces.

10. The method of claim 9 wherein the wall sections are formed of fibrous reinforcing material and resinous material.

11. The method claim 10 further comprising the step of placing a separating material on the main body between the support ribs prior to forming the inner wall to provide a means whereby the inner wall remains independent of the first wall.

12. The method of claim 11 wherein the separating material is a foam, matting, net, screen or mesh which has its outer surface sealed with a polymeric material.

13. The method of claim 1 further comprising forming an inner wall on the tops of the support ribs substantially completely around the inside of the formed tank to form a double wall storage tank system.

14. The method of claim 1 further comprising the steps of placing a separating material on the main body and end caps and then applying a layer of fibrous reinforcing material and resinous material onto the entire surface of the separating material to form a cylindrical-shaped inner wall and inner end caps, prior to the step of positioning the spaced support ribs circumferentially therearound.

15. The method of claim 1 wherein the matrix tank is a metal tank.

16. The method of claim 1 wherein the matrix tank is a fibrous reinforced resinous tank.

17. An internally ribbed storage tank formed inside a matrix tank, said internally ribbed storage tank fully and independently capable of containing liquid and withstanding normal internal and external load forces encountered by underground storage tanks, comprising:
   (a) a cylindrical-shaped main body and end caps attached thereto wherein said main body and end caps are made of a fibrous reinforced resinous material; and
   (b) a set of spaced internal support ribs extending circumferentially around the inside of the cylindrical-shaped main body and secured thereto in a manner whereby the support ribs protrude inwardly.

18. The internally ribbed storage tank of claim 17 wherein the support ribs are substantially uniformly spaced around the inside of the main body on-centerline spacings of from about four inches to about thirty inches.

19. The internally ribbed storage tank of claim 18 further wherein the internal support ribs have apertures through the side walls at or near a lowermost portion to allow the free flow of liquid.

20. The internally ribbed storage tank of claim 18 further comprising an inner wall on the support ribs top surfaces to cover at least the lowermost 10% of the support ribs to provide a smooth continuous surface.

21. The internally ribbed storage tank of claim 17 further comprising an inner wall and inner end caps to form a double wall storage tank system wherein the inner wall comprises a series of wall sections, each said wall section extending between and bonded to side walls of the internal support ribs.

22. The internally ribbed storage tank of claim 17 further comprising an inner wall and inner end caps to form a double wall storage tank system wherein the inner wall is formed on the tops of the support ribs substantially completely around the inside of the formed tank.

23. The internally ribbed storage tank of claim 17 further comprising a layer of separating material covering substantially the entire surface of the main body and end caps and an inner wall and inner end caps over the separating material to form a double wall storage tank system.

24. The internally ribbed storage tank of claim 23 further comprising monitoring means in operable association with the space occupied by the separating material to detect leaking through the main body and end caps or inner wall and inner end caps.

* * * * *